No. 746,715. PATENTED DEC. 15, 1903.
W. D. LINDSAY.
COUPLING GOVERNOR.
APPLICATION FILED SEPT. 29, 1902.
NO MODEL. 2 SHEETS—SHEET 1.
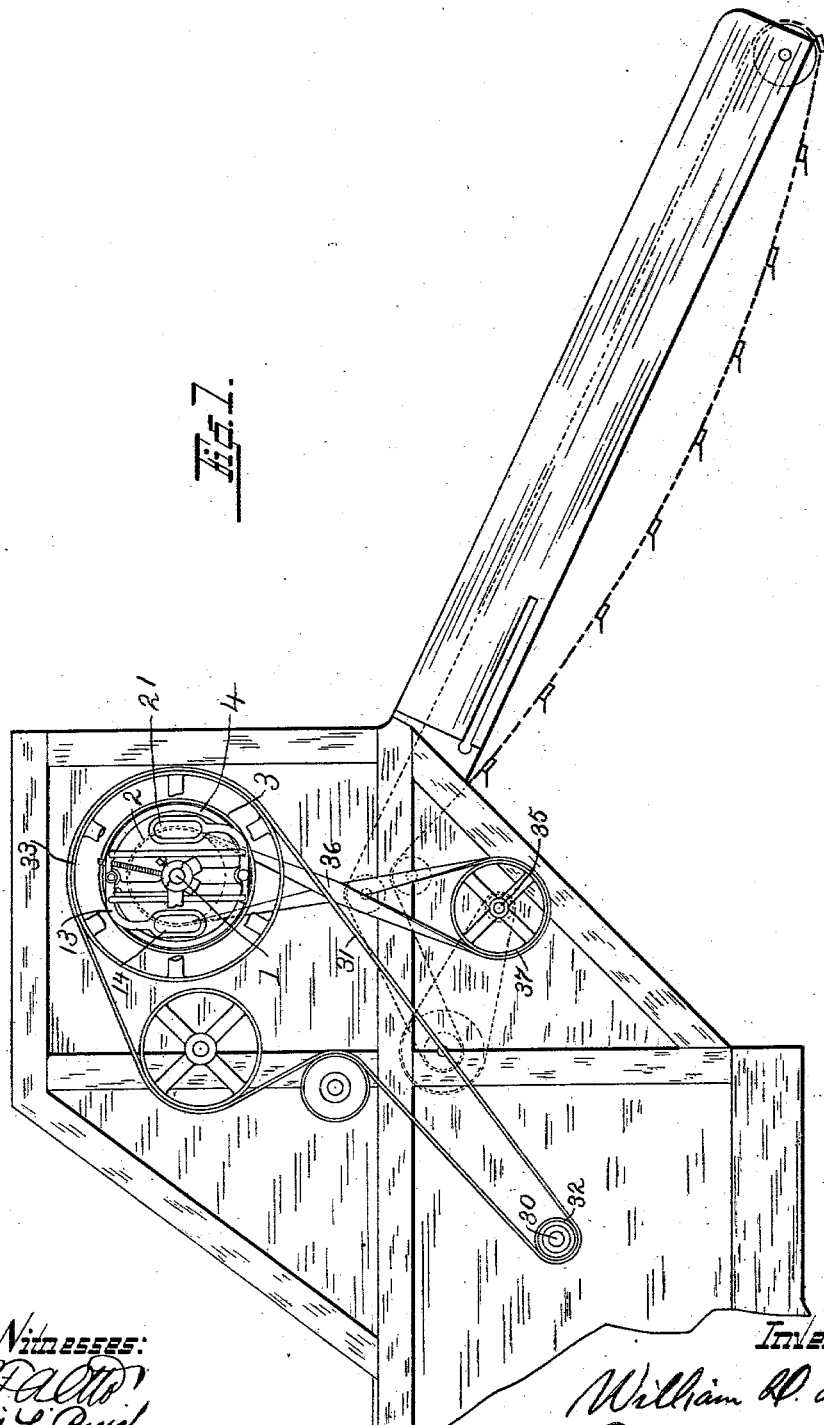

No. 746,715. PATENTED DEC. 15, 1903.
W. D. LINDSAY.
COUPLING GOVERNOR.
APPLICATION FILED SEPT. 29, 1902.
NO MODEL. 2 SHEETS—SHEET 2.
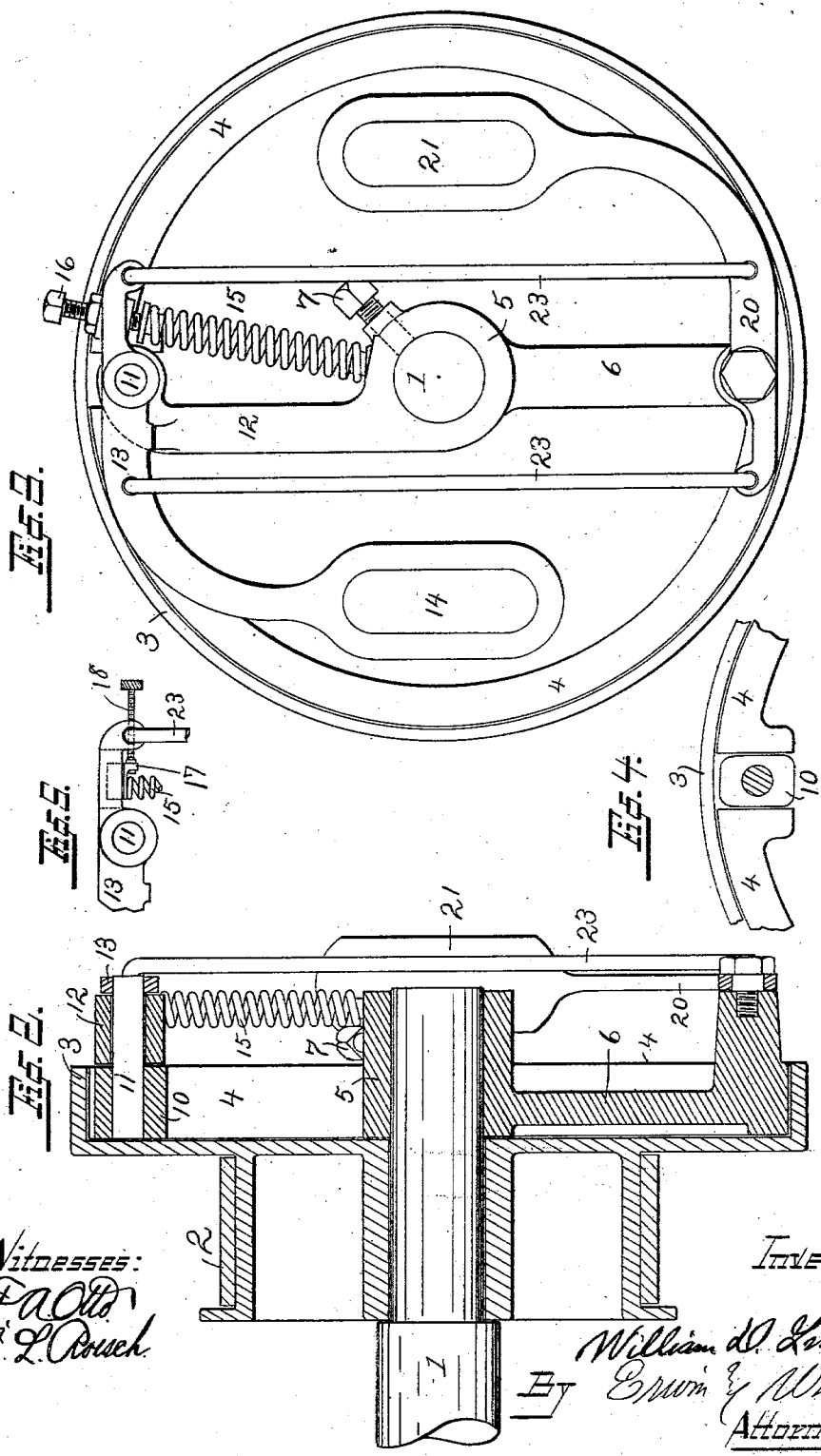
Witnesses:
Inventor
William D. Lindsay
By Erwin & Wheeler
Attorneys.

No. 746,715. Patented December 15, 1903.

UNITED STATES PATENT OFFICE.

WILLIAM D. LINDSAY, OF MILWAUKEE, WISCONSIN.

COUPLING-GOVERNOR.

SPECIFICATION forming part of Letters Patent No. 746,715, dated December 15, 1903.

Application filed September 29, 1902. Serial No. 125,213. (No model.)

*To all whom it may concern:*

Be it known that I, WILLIAM D. LINDSAY, a citizen of the United States, residing at Milwaukee, county of Milwaukee, and State of Wisconsin, have invented new and useful Improvements in Coupling-Governors, of which the following is a specification.

My invention relates to improvements in coupling-governors for threshing-machine feeders.

The object of my invention is to provide a form of governing device which will be sensitive to slight variations in the speed of the threshing-cylinder, whereby the feed will be stopped as soon as the cylinder ceases to revolve at the required speed and resumed in the shortest practical interval after the requisite speed is again attained.

In the following description reference is had to the accompanying drawings, in which—

Figure 1 is a side view of the front end of a threshing-machine and a self-feeder therefor equipped with my invention. Fig. 2 is an enlarged detail side view of the governing mechanism. Fig. 3 is an end view of the governing device. Fig. 4 is a detail view of the eccentric and opposing ends of the split ring, and Fig. 5 is detail view of a modified form of the spring-adjusting mechanism.
Like parts are identified by the same reference characters throughout the several views.

1 is a shaft to which my improved governing device is applied. 2 is a pulley loose on the shaft, and 3 is a ring rigidly connected with the pulley. Within the ring 3 is a split ring 4, which is adapted to be expanded into contact with the ring 3, serving as a clutch. This ring 4 is supported from a hub 5 by an arm 6, and the hub is secured rigidly to the shaft by a screw 7 or other suitable key, whereby the hub and split ring 4 are caused to turn with the shaft. An eccentric block 10 is adjusted between the opposing ends of the ring 4, serving as an expander. This block is held in position by a stem 11, pivotally connected with an arm 12, which projects from the hub, as shown. A lever 13 is secured to the pivot-stem and provided with a governing-weight 14, which is supported in a position to be thrown outwardly by centrifugal force when the supporting-shaft is revolved.

15 is a spring connected at one end with the hub and at the other end with the lever, means being provided, such as the screw-threaded connecting-bolt 16, for regulating the tension of the spring. In the construction shown a compression-spring is used, the same being connected with the lever on the opposite side of the pivot from that to which the weight is attached; but any suitable form of connection or adjustment may be employed in which the spring is made to operate in opposition to the outward movement of the weight. In Fig. 5 the spring is connected with a block 17, shiftable longitudinally of the lever by means of an adjusting-screw 18, swiveled to the block and having screw-threaded bearings in the end of the lever. When the speed of the shaft 1 is such as to throw the weight outwardly in opposition to the action of the spring, the eccentric block 10 will be turned in its position between the opposing ends of the ring 4, and the block is formed to increasingly separate the ends of the ring when so turned, whereby the ring is expanded into forcible contact with the ring 3. The latter, together with the pulley 2, will then be revolved. As soon as the speed of the shaft 1 decreases the spring 15 draws in the governing-weight, when the torque and also the resilience of the metal composing ring 4 will cause it to contract as soon as the block 10 is turned and a shorter diameter interposed between the ring ends.

In the drawings I have shown a second lever 20, pivotally secured to the arm 6 and ring 4 and provided with a governing-weight 21. The lever 20 is connected with the lever 13 by suitable links 23, whereby the two levers and weights connected therewith are made to coöperate. The principal object of duplicating the levers and weights is to balance the parts.

In Fig. 1 of the drawings I have illustrated the connections of my improved coupling. The band-cutting knives (not shown) are mounted on shaft 1, which is driven from the shaft 30 of the threshing-machine cylinder by means of a belt 31 and pulleys 32 and 33 of ordinary type. The pulley is partially broken away to show the coupling. The coupling-pulley 2 drives a shaft 35 of the shaking-pans through the medium of the belt 36 and pulley 37, and motion is communicated from the shaft 35 to the conveyer by other belt-and-pulley connections, (indicated in the drawings by dotted lines.) My invention, however, is not limited to any specific construction or arrangement of the connecting parts, as it will be understood that the coupling may be applied at any point between the power-transmitting or driving mechanism of the thresher and the conveyer of the feeder and the regulating-spring and governor-weight adjusted in correspondence with the speed at that point. With the described construction the frictional contacting surface of the expanding ring is so great and the movement into and out of contact so short that a slight movement of the governing-weights is sufficient to start or stop the conveyer.

Having thus described my invention, what I claim as new, and desire to secure by Letters Patent, is—

1. The combination with a threshing-machine; of a feeding-conveyer therefor; an expansion-ring having its central portion attached to a suitable support connected with the driving mechanism of the thresher; a rim encircling the expansion-ring and connected to drive the conveyer; an eccentric block pivotally mounted upon the expansion-ring support, between suitable frictional-contact abutments on opposite sides of the separating-point of the ring but with said block unconnected with the ring; and governing-weights connected to oscillate said block; said block having eccentric projections adapted to move in wedging frictional contact with the expansion-ring abutments, whereby said ring is expanded by direct frictional pressure against said abutments.

2. The combination with a threshing-machine; of a feeding-conveyer therefor; a supporting-shaft connected with the driving mechanism of the threshing-machine; radially-projecting arms rigidly connected with the shaft; a split ring having its central portion connected with one of said arms; an eccentric block pivotally connected with another of said arms and located between the end portions of the ring; governing-weights; and lever connections between the weights and said eccentric block; said block being disconnected from the abutting portions of the ring but adapted to bear against and spread the same when oscillated.

3. The combination with a threshing-machine; of a feeding-governor therefor; an expansion-ring having its central portion attached to a suitable support connected with the driving mechanism of the thresher; a rim encircling the expansion-ring and connected to drive the conveyer; an eccentric block pivotally mounted on the expansion-ring support, between suitable frictional-contact abutments on opposite sides of the separating-point of the ring but unconnected with the ring; and spring-controlled governing-weights having levers linked together and connected with the block at its pivotal axis; said block having eccentric projections adapted to move in wedging frictional contact with the expansion-ring abutments, whereby said ring is expanded by direct frictional pressure against said abutments.

In testimony whereof I affix my signature in the presence of two witnesses.

WILLIAM D. LINDSAY.

Witnesses:
F. H. LINDSAY,
W. L. ESLIEN.